US012681624B2

(12) United States Patent
Kosmiskas

(10) Patent No.: US 12,681,624 B2
(45) Date of Patent: Jul. 14, 2026

(54) APPLICATION EXTENSIBILITY FOR SMART DEVICE CONTROL

(71) Applicant: Google LLC, Mountain View, CA (US)

(72) Inventor: Mario Kosmiskas, Mercer Island, WA (US)

(73) Assignee: Google LLC, Mountain View, CA (US)

( * ) Notice: Subject to any disclaimer, the term of this patent is extended or adjusted under 35 U.S.C. 154(b) by 163 days.

(21) Appl. No.: 18/428,249

(22) Filed: Jan. 31, 2024

(65) Prior Publication Data

US 2024/0264724 A1 Aug. 8, 2024

Related U.S. Application Data

(60) Provisional application No. 63/444,128, filed on Feb. 8, 2023.

(51) Int. Cl.
*G06F 3/048* (2013.01)
*G06F 3/0484* (2022.01)
*G06F 9/451* (2018.01)

(52) U.S. Cl.
CPC ............ *G06F 3/0484* (2013.01); *G06F 9/451* (2018.02)

(58) Field of Classification Search
CPC ................................ G06F 3/0484; G06F 9/451
See application file for complete search history.

(56) References Cited

U.S. PATENT DOCUMENTS

| | | | |
|---|---|---|---|
| 10,361,878 B1 * | 7/2019 | Loreille | .............. H04L 12/2816 |
| 2016/0337453 A1 | 11/2016 | Lee | |
| 2019/0260770 A1 * | 8/2019 | Sansom | .............. H04L 63/1441 |
| 2021/0132559 A1 * | 5/2021 | Ni | .......................... G05B 15/02 |
| 2021/0397313 A1 * | 12/2021 | Desai | ................... G06F 3/0482 |
| 2022/0027025 A1 * | 1/2022 | Shim | ...................... H04L 12/12 |

* cited by examiner

*Primary Examiner* — Mahelet Shiberou
(74) *Attorney, Agent, or Firm* — Lerner David LLP

(57) ABSTRACT

Features described herein pertain to extending the functionality of an application executing on an electronic device. A device trait specification associated with a smart device can be used to generate an application extension template for defining a layout of a graphical user interface page of the application and binding at least one device trait of the set of device traits to the application. An application extension can be generated based on the application extension template being populated with layout defining values and binding values. The application extension can be provided to the application. The application extension can cause the graphical user interface page of the application to be displayed on a display of the electronic device with the defined layout and elements bound to the layout and configured to cause the smart device to be controlled based on the device traits.

20 Claims, 10 Drawing Sheets

500A

Access a device trait specification

502

Generate an application extension template

504

Provide the application extension template

506

Receive an extension container

508

Store the extension container

510

500B

Access an extension container

512

Generate application extension

514

Store application extension

516

500C

Receive request for application extension

518

Provide application extension

520

600

APPLICATION EXTENSIBILITY FOR SMART DEVICE CONTROL

CROSS-REFERENCE TO RELATED APPLICATIONS

This application claims priority to U.S. Provisional Patent Application No. 63/444,128 filed Feb. 8, 2023, the entire disclosure of which is hereby incorporated by reference, for all purposes, as if fully set forth herein.

BACKGROUND

Users have found it convenient to use smart devices (e.g., smart thermostats) to automate their homes. Control of these smart devices is often performed using one or more applications installed on the user's mobile phone or other computerized device. A user is often required to install a different application for each smart device they wish to control. In some cases, a device manufacturer offering more than one type of smart device may provide a home automation application that can collectively control smart devices manufactured by that manufacturer. Therefore, it may be desirable to integrate smart devices into an application for controlling smart devices.

SUMMARY

Embodiments described herein pertain to smart devices, and more particularly, a system and method for extending functionality of an application.

In some embodiments, a method for extending functionality of an application executing on an electronic device includes accessing an extension container, the extension container comprising an application extension template populated with layout defining values configured to define a layout of a graphical user interface page of the application and binding values configured to link device traits to the graphical user interface page, wherein each device trait of the device traits corresponds to a function of a smart device that is in wireless communication with the electronic device; and providing an extension comprising the extension container to the electronic device.

In some embodiments, the extension, when implemented by the application, is configured to cause the graphical user interface page of the application to be displayed on a display of the electronic device with the layout, wherein the layout comprises a plurality of graphical user interface elements that are configured to cause the smart device to be controlled based on the device traits.

In some embodiments, the binding values are configured to link the device traits to the plurality of graphical user interface elements, each element of the plurality of graphical user interface elements is configured to cause a function of the smart device to be controlled based on a device trait included in the device traits.

In some embodiments, prior to providing the extension to the electronic device, the method further includes receiving a request for an application extension from the electronic device.

In some embodiments, the application extension template is populated with the layout defining values and the binding values based on input received by a user.

In some embodiments, the device traits are included in a device trait specification that is associated with the smart device.

In some embodiments, the extension container is based on JavaScript.

Some embodiments include a system that includes a processing system and at least one computer-readable medium storing instructions which, when executed by the processing system, cause the system to perform part or all of the operations and/or methods disclosed herein.

Some embodiments include one or more non-transitory computer-readable media storing instructions which, when executed by at least one processing system, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
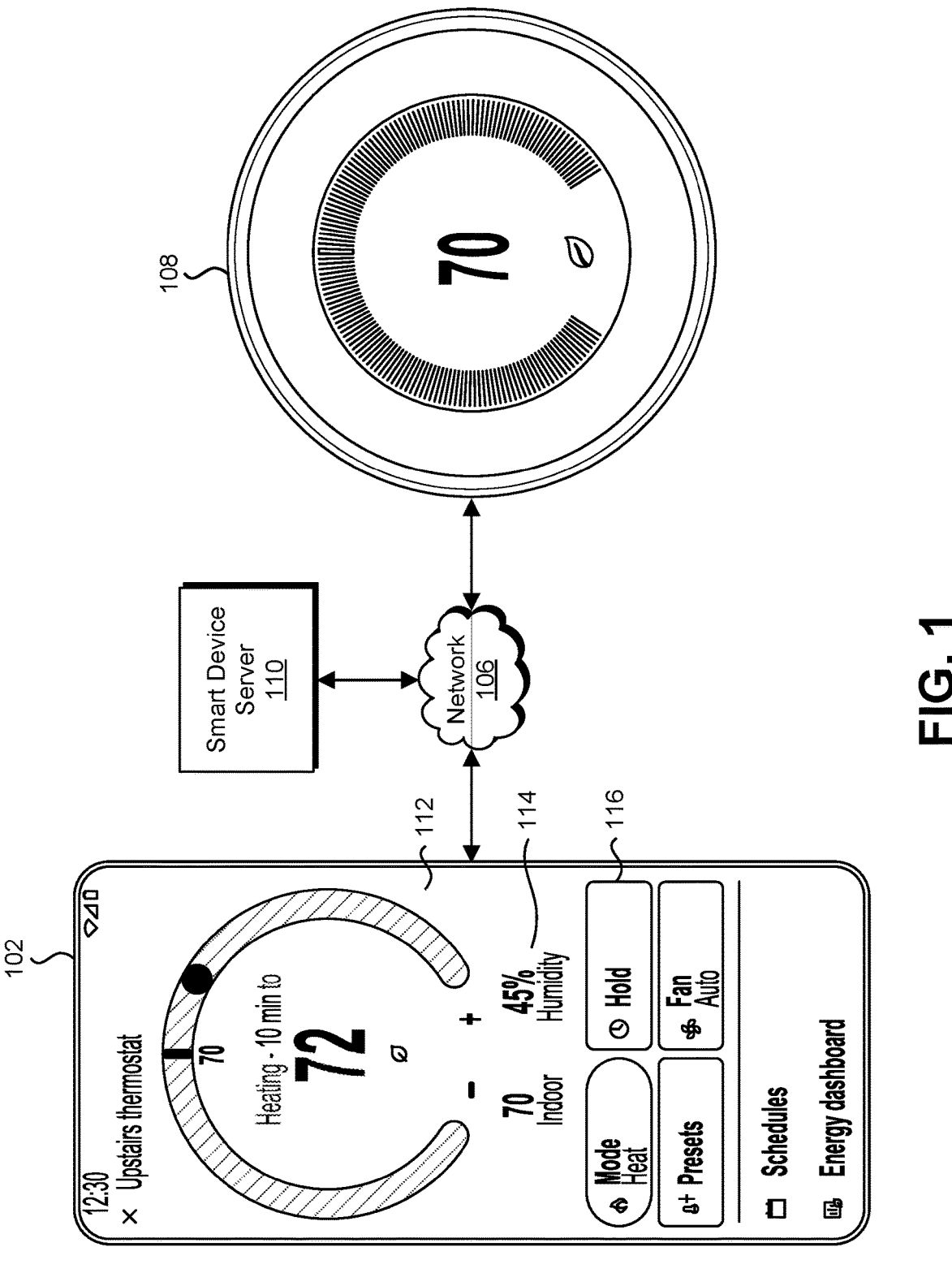
FIG. 1 illustrates an example of a system for controlling a smart device according to some implementations of the present disclosure.

Smart devices have become prevalent. They are often used in various residential and commercial environments such as homes and office buildings to automate tasks. For example, a semi-automated household may include several smart devices such as smart thermostats, smart appliances, smart TVs, and the like. In some cases, different categories of smart devices can be offered under different brands and/or by different manufacturers. For example, a company or brand specializing in offering smart home appliances such as smart refrigerators and smart laundry centers may not offer smart thermostats or smart lights. Setting up, controlling, and managing these smart devices is often performed using one or more applications installed on one or more electronic devices such as tablets, mobile phones, home assistant devices, display devices, and the like. Typically, to control all smart devices in a given ecosystem such as a user's home, the user will end up relying on several different applications installed on their electronic devices (e.g., their mobile phone, tablet, etc.) with each application providing a different user experience. With such an arrangement, it can often be confusing for technical and non-technical users alike to interact with their smart devices and may limit broader adoption of smart devices and home automation systems.

In some cases, smart device manufacturers may not have the resources, the knowledge, and/or interest to develop or provide applications to manage the smart devices they manufacture. In other cases, smart device manufacturers may not have the resources, knowledge, or interest to integrate management of their smart devices with existing smart device management applications. As such, these smart device manufacturers may be disincentivized from participating in a home automation ecosystem. Home automation control applications have proven to be useful for managing and controlling different smart devices using a single application. For example, a home automation control application such as the Google Home application offered by Google LLC can be used to set up and control several different smart devices. While these home automation control applications often enable users to integrate new smart devices into their smart environment or smart home ecosystem, the smart devices that can be integrated into these applications are typically limited to particular smart devices and/or smart devices manufactured or offered by particular manufacturers/brands. Furthermore, even when a smart device offered by one provider is integrated with a home automation control application offered by another provider, control of the smart device may be limited to select functions rather than all its functions and/or the ability to control the smart device may otherwise be limited. Therefore, it may be desirable to provide a means for integrating smart devices into applications for setting up, controlling, and managing smart devices.

The techniques described herein overcome the foregoing challenges and/or others by providing a system and method for extending smart home control applications. Using the techniques described herein, device manufacturers/brands can integrate their smart home devices into smart home control applications with minimal software/hardware development effort by the device manufacturers/brands and without modifying the native experiences (e.g., look, feel, and operation) of the smart home control applications. The cross-platform extensibility mechanism described herein enables functionality of applications to be extended regardless of the platform in which the application is offered by dynamically providing extensions that enable the applications to integrate setup, control, and management of smart devices that they were otherwise not developed to setup, control, and manage. With the techniques disclosed herein, technical and non-technical users can setup, control, and manage their smart devices, even if manufactured/offered by different manufacturers/brands, in an intuitive way and device manufacturers/brands do not need to develop/provide applications for setup, control, and management of their smart devices.

In some embodiments, a method for extending functionality of an application executing on an electronic device includes accessing a device trait specification associated with a smart device in wireless communication with the electronic device, wherein the device trait specification comprises a set of device traits, each device trait of the set of device traits corresponding to a function of the smart device; generating an application extension template based on the device trait specification, wherein the application extension template comprises a layout defining section for defining a layout of a graphical user interface page of the application and a binding section for binding at least one device trait of the set of device traits to the application; receiving an extension container comprising the application extension template populated with layout defining values configured to define a layout of the graphical user interface page and binding values configured to link a subset of device traits of the set of device traits to the graphical user interface page; and providing an extension comprising the extension container to the electronic device.

In some embodiments, a request for an application extension can be received by the server from the electronic device, and, in response, the server system can provide the application extension to the electronic device. The extension container within the application extension can be configured to cause the graphical user interface page of the application to be displayed on a display of the electronic device with the layout, which can include elements that are configured to cause the smart device to be controlled based on the device traits in the subset of device traits. The binding values can be configured to link the subset of device traits to the elements where each element can be configured to cause a function of the smart device to be controlled based on a device trait included in the subset of device traits.

While techniques described herein are described with respect to smart devices and applications for setting up, controlling, and managing those devices, the techniques described herein are not intended to be limited to such devices and applications and can be applied to any devices and applications for controlling devices. Additionally, the techniques described herein, and the foregoing advantages are not intended to be exhaustive, and other advantages of the described techniques will become apparent in the following description.

FIG. 1 illustrates an example of a system for controlling a smart device. As shown FIG. 1, a system 100 can include an electronic device 102, a network 106, a smart device 108, and a smart device server 110. The electronic device 102 shown in FIG. 1 is a smart phone such as the Google® Pixel® Phone, but this is not intended to be limiting, and the electronic device 102 can be a tablet such as the Google® Pixel® Tablet and/or an assistant device such as the Google® Nest® Hub or Google® Nest® Hub Max. The smart device 108 shown in FIG. 1 is a smart thermostat such as Google's Nest Learning Thermostat®, but this is not intended to be limiting, and the smart device 108 can be any smart device such as a smart lamp, smart garage door opener, smart lock, and the like. The electronic device 102 and the smart device 108 can be configured to communicate with one another via network 106 and smart device server 110.

Network 106 can be public and/or private and include any kind of wireless and/or wired network. Example networks include Ethernet networks, the Internet, Wi-Fi networks, Bluetooth® networks, and the like. Communication involving the network 106 can be implemented using any kind of networking technology and/or communication protocol such as Matter; ZigBee; IrDA; RFID; NFC; WLAN; Z-wave; Wi-Fi and Wi-Fi Direct; UWB; USB; ANT and ANT+; 3G; 4G; 5G; 6G, and the like. Smart device server 110 can be a server hosted on a cloud infrastructure such as Google Cloud offered by Google LLC. In some implementations, the smart device server 110 can be established and managed by a manufacturer/developer of the smart device 108 to facilitate communication with the smart device 108. In other implementations, the smart device server 110 can be established and managed by a developer of an application for setting up, controlling, and managing the smart device 108.

In some implementations, the electronic device 102 can execute an application for setting up, controlling, and managing the smart device 108. Upon execution, the application can present a graphical user interface on a display of the electronic device 102. For example, as shown in FIG. 1, executing the application can cause a graphical user interface page 112 of a graphical user interface to be displayed on a display of the electronic 102. The graphical user interface page 112 can enable a user of the electronic device 102 to interact with the graphical user interface page 112 (e.g., via touch input through the display and/or other input mechanisms) to set up, control, and/or manage the smart device 108. The graphical user interface page 112 can include, but is not limited to, one or more elements 114 for presenting information about the smart device 108 and one or more elements 116 for controlling the smart device 108. For example, as shown in FIG. 1, elements of elements 114 can used to present the current ambient temperature and the current ambient relative humidity and elements of elements 116 can be used to control the mode and fan speed of the smart device 108.

The smart device server 110 can be configured to facilitate communication between the electronic device 102 and the smart device 108. For example, information about the smart device 108 such as information that is to be presented in the graphical user interface page 112 can be sent from the smart device 108 through the network 106 to the smart device server 110 where it can be received and sent to the electronic device 102 through the network 106. Similarly, information for setting up, controlling, and managing the smart device 108 can be sent from the electronic device 102 through the network 106 to the smart device server 110 where it can be received and sent to the smart device 108 through the network 106. In some implementations, the electronic device 102 can communicate with the smart device 108 without involving the smart device server 110 (e.g., via a WiFi direct connection and/or Bluetooth connection). Communication between the electronic device 102 and the smart device 108 can be facilitated using the Matter protocol, which is a unifying, Internet Protocol-based connectivity protocol for establishing and maintaining Internet-of-Things ecosystems.

While the application described with respect to FIG. 1 can be used for setting up, controlling, and managing a smart thermostat, it may be desirable to extend the functionality of the application to control different smart devices. For example, it may be desirable to extend functionality of the application to set up, control, and manage smart devices manufactured/provided by different manufacturers/brands and smart devices in which the application was not particularly developed/designed for. The techniques described herein provide, among other things, an extensibility mechanism for extending functionality of an application for setting up, controlling, and managing smart devices.

Figure 2:
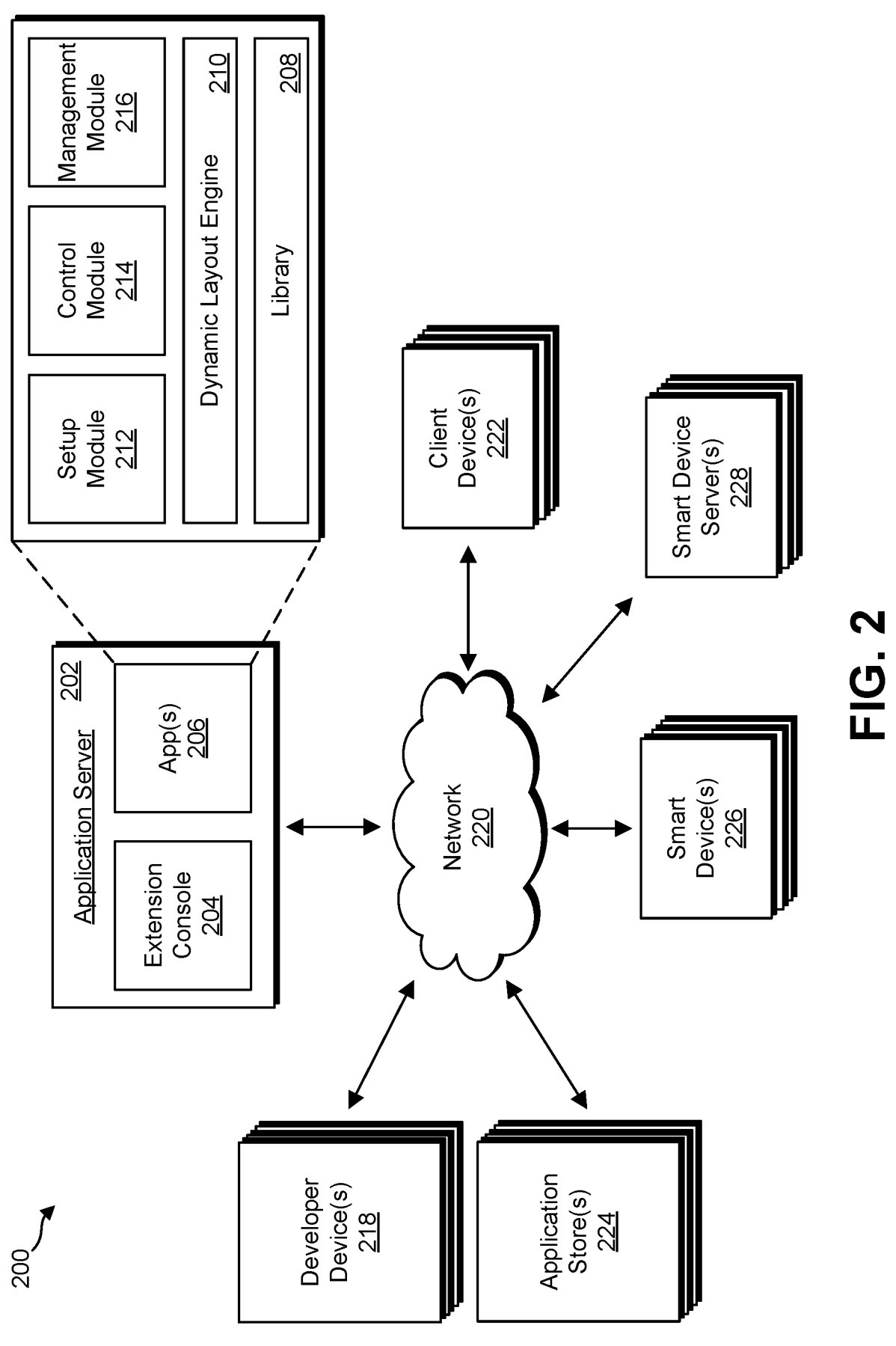
FIG. 2 illustrates an example of a system for extending an application according to some implementations of the present disclosure.

FIG. 2 illustrates an example of a system for extending functionality of an application. As shown in FIG. 2, the system 200 can include an application server 202, one or more developer devices 218 (also referred to as "developer device 218"), one or more client devices 222 (also referred to as "client device 222"), one or more application stores 224 (also referred to as "application store 224"), one or more smart devices 226 (also referred to as "smart device 226"), and one or more smart device servers 228 (also referred to as "smart device server 228") in communication with each other via a network 220.

Network 220 can be any kind of network, wired or wireless, which can facilitate communications among components of the environment 200. For example, network 220 can include one or more public networks, private networks, local area networks, wide area networks, any combination thereof, and the like. Example of such networks include Internet, a Wi-Fi network, a Bluetooth® network, and the like. Network 220 communication can be implemented using any networking technology and/or communication protocol. Examples of such technologies and protocols include Matter; ZigBee; IrDA; RFID; NFC; WLAN; Z-wave; Wi-Fi and Wi-Fi Direct; UWB; USB; ANT and ANT+; 3G; 4G; 5G; 6G, and the like.

The application server 202 includes an extension console 204 and one or more applications 206 (also referred to as "application 206"). The application 206 can be downloaded from the application server 202 through the network 220 and installed on the client device 222. For example, the client device 222 can connect to the network 220, access application store 224, and select the application 206 for download, and, in response, the application server 202 can transfer the selected application 206 through the network 220 to the client device 222 where it can be installed. Once installed, the application 206 can be executed and used to set up, control, and manage the smart device 226. For example, the client device 222 can connect to the smart device server 228 using the network 220 and send a command for controlling the smart device 226 to the smart device server 228, and, in response, the smart device server 228 can send the command to the smart device 226. The application server 202, developer device 218, client device 222, smart device 226, and smart device server 228 can be implemented using one or more electronic devices such as electronic device 702 shown in FIG. 7 and can be configured with one or more operating systems and software programs that facilitate the techniques described herein. In some implementations, a least one device of system 200 such as client device 222 can be implemented as a mobile phone and/or computing device such as a Google® Pixel® Tablet and Google® Pixel® Phone and/or an assistant device such as a Google® Nest® Hub and Google® Nest® Hub Max.

The application 206, upon execution on a device such as client device 222, can be configured to provide a graphical user interface for display on a display of the client device 222. The graphical user interface can be configured for setting up, controlling, and/or managing smart devices such as smart devices 226. For example, the graphical user interface can include a first of set of graphical user interface pages for setting up, controlling, and/or managing a first smart device 226 such as a smart thermostat and a second set of graphical user interface pages for setting up, controlling, and/or managing a second smart device 226 such as a smart light. To set up, control, and/or manage a smart device, a user of the client device 222 can interact with the one or more graphical user interface pages for example via touch input and/or voice input. In response, the application 206 can be configured to cause the client device 222 to communicate with the smart device server 228 which in turn can communicate with the smart device 226.

In some implementations, the graphical user interface can include graphical user interface pages for installing, initializing, and/or setting up the smart device 226 and/or otherwise integrating the smart device 226 into the application 206 (e.g., facilitating an out of the box experience). The graphical user interface can also include graphical user interface pages for changing the settings and/or preferences associated with the smart device 226. The graphical user interface can also include graphical user interface pages for managing the smart device 226 such as creating routines and/or parameters under which the smart device 226 can operate individually and/or controlling a communication between smart devices in a smart device ecosystem.

As shown in FIG. 1, an example of a smart device is a smart thermostat. In the case of a smart thermostat as an example, one or more graphical user interface pages can be provided for facilitating an out of the box experience for the smart thermostat (e.g., facilitating installation, initialization, set up, integration, etc.), controlling and/or operating the smart thermostat (e.g., increasing the temperature and decreasing fan speed), and changing the settings or the preferences of the smart thermostat (e.g., temperature display in Celsius). Additionally, one or more graphical user interface pages can be provided for creating a routine or parameters under which the smart thermostat can operate individually and/or in combination with other smart devices (e.g., a smart ceiling fan) that are also integrated with the application 206 (e.g., increase temperature and decrease fan speed between 11 PM and 6 AM).

In some implementations, the application 206 can be configured to facilitate an out of the box experience, control and/or operate, manage, and/or change the settings or the preferences of default smart devices. For example, the application 206 can be configured to do the facilitating, controlling and/or operating, managing, and/or changing for smart devices made by a particular manufacturer(s), offered by a particular brand(s), and/or that perform a certain function or set of functions (e.g., home automation type functions). Additionally, and/or alternatively, the application 206 can be configured to do the facilitating, controlling and/or operating, managing, and changing for smart devices offered by different manufacturers/brands and/or that perform different functions (e.g., home automation type and entertainment type functions). In some implementations, the application 206 can be configured to do the facilitating, controlling and/or operating, managing, and changing while it is stored on the application server 202 (e.g., access through a cloud portal). In some implementations, the application 206 can be configured to do the facilitating, controlling, and/or operating, managing, and changing after it has been downloaded and installed on the client device 222 (e.g., by downloading code, extensions, and/or other content).

The application 206 can be configured with a library 208, a dynamic layout engine 210, a setup module 212, a control module 214, and a management module 216. The library 208 can include interface elements which can be selected for defining layouts of graphical user interface pages of the application 206. The interface elements can include various graphical user interface elements such as menus, buttons, icons, widgets, switches, indicators, and others. Each graphical user interface page of the application 206 can include one or more graphical user interface elements selected from the library 208 and spatially positioned with the respective graphical user interface page. Additionally, each graphical user interface page can have a varying number of graphical user interface elements that are spatially positioned at distinct positions within the respective graphical user interface page.

The dynamic layout engine 210 can be configured to generate the graphical user interface pages of the application 206 using the user interface elements selected from the library 208. In some implementations, the dynamic layout engine 210 can be configured to generate the graphical user interface pages of the application 206 based on a set of instructions. For example, upon receiving the set of instructions, the dynamic layout engine 210 can be configured to generate one or more graphical user interface pages by executing the instructions, selecting user interface elements from the library 208 according to the instructions, and arrange the selected user interface elements in the one or more graphical user interface pages according to the instructions. In some implementations, the instructions can be provided by the application server 202. In some implementations, the instructions can be based on input received by the developer device 218 and provided to the application server 202.

In some implementations, the dynamic layout engine 210 can be configured to generate one or more graphical user interface pages based on one or more application extensions. For example, the application server 202 can generate one or more application extensions, with each application extension including one or more extension containers, and provide those one or more application extensions to the application 206. Each application extension can represent an extension of a functionality of the application 206. Upon receiving an application extension, the dynamic layout engine 210 can decode, interpret, and/or implement instructions included in the extension container of the application extension, select user interface elements from the library 208 according to the instructions, and arrange the selected user interface elements in one or more graphical user interface pages according to the instructions.

The graphical user interface pages generated by the dynamic layout engine 210 can be presented on a display of the client device 222. One or more users of the client device 222 can view and interact with the graphical user interface pages in order to facilitate the setup, control, and management of the smart device 226. In some implementations, the dynamic layout engine 210 can generate a set of graphical user interface pages for each smart device integrated and/or that is to be integrated with the application 206. In some implementations, the dynamic layout engine 210 can generate one or more graphical user interface pages for setting up the smart device 226, one or more graphical user interface pages for controlling the smart device 226, and one or more graphical user interface pages for managing the smart device 226.

The setup module 212 can be configured to present the one or more graphical user interface pages for setting up a smart device on the display of the client device 222. The one or more graphical user interface pages for setting up the smart device 226 can facilitate the initial integration of the smart device 226 with the application 206. For example, a user of the client device 222 may wish to integrate a newly purchased smart device 226 with the application 206, which is executing on the client device 222. To do so, the setup module 212 can present one or more graphical user interface pages that facilitate the initial setup of the smart device 226 with the application 206 (e.g., installing the device, specifying the device type, its model number, and its serial number; connecting to the device; setting initial operating parameters, and the like). To facilitate setup of the smart device 226, a user can interact with the one or more graphical user interface pages to make one or more selections. For example, a display of the client device 222 can be configured to receive a touch input from the user and the client device 222 can be configured to identify which graphical user interface elements of the graphical user interface page the touch input corresponds to and generate corresponding commands for setting up the smart device 226. The commands can be packaged in messages and sent to the smart device server 228 for the smart device 226. In response, the smart device server 228 can communicate with the smart device 226 to facilitate setup of the smart device 226 based on the commands.

The control module 214 can be configured to present the one or more graphical user interface pages for controlling and/or operating a smart device on the display of the client device 222. The one or more graphical user interface pages for controlling and/or operating the smart device 226 can facilitate the control and/or operation of a smart device that has been already integrated with the application 206 (e.g., via the setup module 212). For example, a user of the client device 222 may wish to control a previously integrated smart device 226 with the application 206, which is executing on the client device 222. To do so, the control module 214 can present one or more graphical user interface pages that facilitate the control and/or operation of the smart device 226 with the application 206 (e.g., turning on a fan in the case of a smart fan, changing the temperature in the case of a smart thermostat). To facilitate controlling and/or operating the smart device 226, a user can interact with the one or more graphical user interface pages to make one or more selections. For example, a display of the client device 222 can be configured to receive a touch input from the user and the client device 222 can be configured to identify which graphical user interface elements of the graphical user interface page the touch input corresponds to and generate corresponding commands for operating and/or controlling the smart device 226. The commands can be packaged in messages and sent to the smart device server 228 for the smart device 226. In response, the smart device server 228 can communicate with the smart device 226 to facilitate control and/or operation of the smart device 226 based on the commands.

The management module 216 can be configured to present the one or more graphical user interface pages for managing a smart device on the display of the client device 222. The one or more graphical user interface pages for managing the smart device 226 can facilitate changing, modifying, and/or updating the operational settings, preferences, and/or parameters of a smart device that has been already integrated with the application 206 (e.g., via the setup module 212). For example, a user of the client device 222 may wish to modify the settings or operational parameters of a previously integrated smart device 226 with the application 206, which is executing on the client device 222. To do so, the control module 214 can present one or more graphical user interface pages that facilitate management of the smart device 226 with the application 206 (e.g., changing a backlight display of a smart thermostat from light to dark).

To facilitate management of the smart device 226, a user can interact with the one or more graphical user interface pages to make one or more selections. For example, a display of the client device 222 can be configured to receive a touch input from the user and the client device 222 can be configured to identify which graphical user interface elements of the graphical user interface page the touch input corresponds to and generate corresponding commands for managing the smart device 226. The commands can be packaged in messages and sent to the smart device server 228 for the smart device 226. In response, the smart device server 228 can communicate with the smart device 226 to facilitate management of the smart device 226 based on the commands.

The extension console 204 can be configured to generate one or more application extensions for extending the functionality of the application 206. Each application extension can include an application extension container and each application extension container can include an application extension template that has been populated with layout defining values and binding values. The layout defining values of the application extension template can be configured to define a layout of one or more graphical user interface pages of the application 206. The binding values of the application extension template can be configured to link device traits of the smart device 226 to the one or more graphical user interface pages. As discussed above, each graphical user interface page can have a layout that includes one or more graphical user interface elements, where one or more of the graphical user interface elements can be interacted with to control the smart device 226. The smart device 226 can be controlled based on device traits associated with the smart device 226. In some implementations, the binding values of the application extension template can be configured to link the device traits of the smart device 226 to the graphical user interface elements of the one or more graphical user interface pages such that at least one graphical user interface element can be interacted with to control a function of the smart device.

To generate an application extension, the extension console 204 can be configured to access one or more device trait specifications associated with one or more smart devices. A device trait specification for a smart device can include a set of device traits for the smart device, where each device trait of the set of device traits for the smart device corresponds to a characteristic and/or function of the smart device. In some implementations, device trait specifications can be received from the smart device 226 and/or stored on the application server 202. For example, the application server 202 can be configured to communicate through the network 220 with the smart device server 228 to retrieve device trait specifications for the smart device 226 and store them on the application server 202 such that they can be accessed. In some implementations, device trait specifications can be received from the client devices 222 and/or the developer device 218. For example, the application server 202 can be configured to communicate through the network 220 with the client devices 222 and/or the developer device 218 to retrieve device trait specifications for the smart device 226 and store them on the application server 202 such that they can be accessed. In some implementations, the device trait specifications can be accessed as soon as they are received by application server 202 and/or at a later time.

The extension console 204 can be further configured to generate one or more application extension templates based on the one or more device trait specifications. An application extension template can be generated for the smart device

Figure 3A:
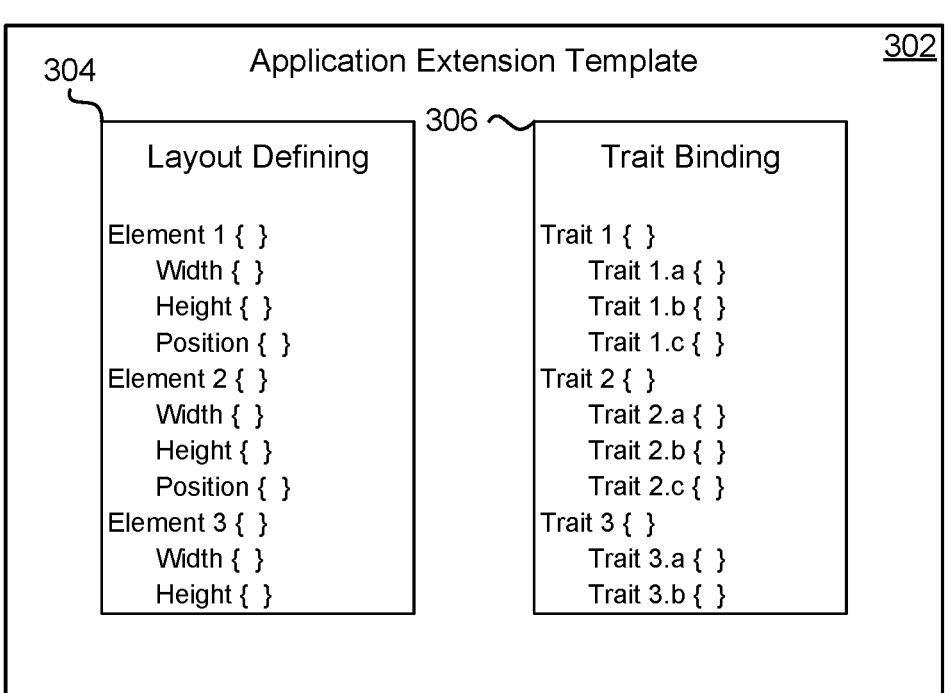
FIG. 3A illustrates an example of an application extension template according to some implementations of the present disclosure.

226 based on the device trait specification for the smart device 226. In some implementations, the application extension template can be implemented in a programming language such as JavaScript. FIG. 3A illustrates an example of an application extension template 302. As shown in FIG. 3A, the application extension template 302 can include a layout defining section 304 for facilitating the defining of a layout of one or more graphical user interface pages of the application 206 and a trait binding section 306 for facilitating the binding (linking or associating) of at least one device trait of the set of device traits for the smart device 226 to the application 206.

The layout defining section 304 can be configured to facilitate defining of a layout of the one or more graphical user interface pages by identifying spatial locations in the one or more graphical user interface pages in which user interface elements in the library 208 can be placed. For example, as shown in FIG. 3A, for a given graphical user interface page, the layout defining section 304 can identify first, second, and third graphical user interface elements (e.g., Element 1, Element 2, Element 3) and positions (e.g., Position) and dimensions (e.g., Width, Height) for those graphical user interface elements. In this way, an extension developer or user can facilitate defining one or more layouts for one or more graphical user interface pages of the application 206.

The trait binding section 306 can be configured to facilitate binding at least one device trait of the set of device traits for the smart device 226 to the application 206 by identifying a device trait and associating the device trait with the graphical user interface elements identified in the layout defining section 304. For example, as shown in FIG. 3A, for a given set of device traits, the trait binding section 306 can identify first, second, and third device traits (e.g., Trait 1, Trait 2, and Trait 3) and bind those identified device traits to the first, second, and third graphical user interface elements identified in the layout defining section 304. In this way, the extension developer or user can facilitate linking or associating or binding one or more device traits of the smart device 226 to one or more graphical user interface elements in one or more graphical user interface elements of the application 206. In some implementations, binding device traits to the graphical user interface elements of the graphical user interface pages of the application 206 enables the application 206 to present information about the smart device 226 and facilitate control of the smart device 226. For example, in the case of a smart thermostat, the application 206 can be configured to present a heating temperature the smart thermostat is set to in a first spatial position of a graphical user interface page and facilitate control (e.g., changing the temperature) of the smart thermostat in a second spatial position of the graphical user interface page as defined by the layout defining section 304.

Figure 3B:
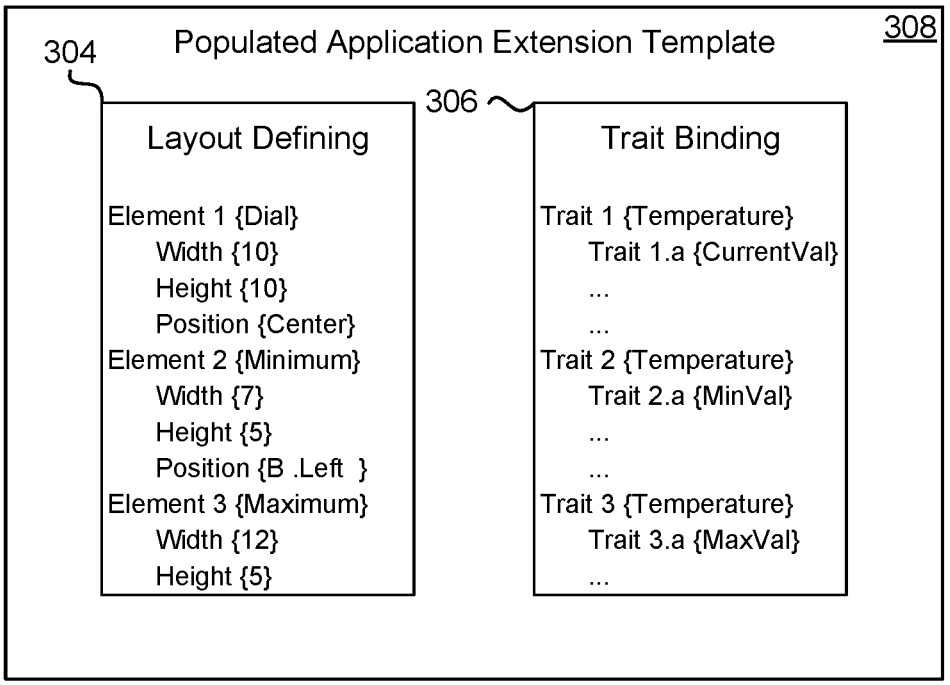
FIG. 3B illustrates an example of a populated application extension template according to some implementations of the present disclosure.

In some implementations, the extension console 204 can be further configured to provide the one or more device trait specifications and one or more application extension templates 302 to the developer device 218 where they can be populated with values. For example, the extension console 204 can be configured to package the one or more device trait specifications and one or more application extension templates 302 in one or more application packages and transfer, via the network 220, the one or more application packages to the developer device 218. The developer device 218 can then be configured to populate the one or more application extension templates 302 to form one or more populated application extension templates 308. Each application extension template 302 can be populated with layout defining values and binding values. For example, as shown in FIG. 3B, the developer device 218 can populate the application extension template 302 with layout defining values and binding values. In some implementations, the extension console 204 can be further configured to provide access to the device trait specifications and the one or more application extension templates where they can be populated by accessing the application server 202 (e.g., based on input received by a user interface of the application server 202). The application extension template 302 can be provided to a developer and/or user using the graphical user interface pages of the extensibility console 204 and/or the developer device 218.

A developer and/or user can then populate the application extension template 302. The developer and/or user can populate the application extension template 302 by selecting user interface elements that should be included in a graphical user interface page and where in that graphical user interface page those user interface elements should be spatially located. For example, the developer and/or user may indicate, using layout defining section 304 of the application extension template 302, that a dial icon should appear on the graphical user interface page in a particular column and row of the graphical user interface page at a certain size. The developer and/or user can also populate the application extension template 302 by selecting binding properties and the device traits of the device trait specification of the smart device 226 that should be linked, bound, and/or associated with the selected user interface elements. In some implementations, the developer and/or user can populate the application extension template 302 by manipulating graphical user interface pages of the extensibility console 104. The graphical user interface pages of the extensibility console 104 can include menus, buttons, icons, drag and drop functionality, and other features and/or functionalities that enable the developer and/or to manipulate the graphical user interface pages and populate the application extension template 302.

The layout defining values can be configured to define a layout of one or more graphical user interface pages of the application 206 by, for example, identifying values for the graphical user interface elements identified in the application extension template 302 (e.g., the first, second, and third graphical user interface elements shown in FIG. 3A). The layout defining values can be associated with graphical user interface elements of the library 208. For example, as shown in FIG. 3B, a graphical user interface element representing a dial, graphical user interface element representing a minimum amount (e.g., a minus sign), and a graphical user interface element representing a maximum amount (e.g., a plus sign) can be included in the library 208 and can be identified as layout defining values for the first, second, and third graphical user interface elements of the application extension template 302.

The binding values can be configured to link device traits of a smart device to the one or more graphical user interface pages of the application 206, and, more particularly, to link the device traits to the one or more graphical user interface elements identified in the layout defining section 304. For example, as shown in FIG. 3B, a temperature device trait corresponding to a set heating or cooling temperature of the smart device 226 can be linked to the dial graphical user interface element, a minimum value device trait corresponding to a minimum temperature of a temperature range, and a maximum value device trait corresponding to a maximum temperature of the temperature range.

In some implementations, once the one or more application extension templates are populated, the developer device 218 can be configured to package the one or more populated application extension template into one or more extension containers and transfer, via the network 220, the one or more extension containers to the application server 202. Upon receiving an extension container, the extension console 204 can be configured to store the extension container on the application server 202 where it can be accessed and/or generate an extension that includes the extension container. For example, the application server 202 can be configured to store extension containers and generate an extension that includes a selected extension container. The extension container and/or extension can be based on a programming language such as JavaScript. The extension for the smart device 226 can be stored in the application server 202 where it can be later retrieved (to be described later).

In some implementations, the extension console 204 can be configured with one or more graphical user interface pages that enable a developer and/or user to develop and manage application extensions. In some implementations, the extensibility console 204 can be an application programming interface of the application server 202. In other implementations, the extensibility console 204 can be configured to provide developers and/or users with a software development kit that enables the developers and/or users to develop and manage extensions on another device (i.e., a device other than the application server 202) such as the developer device 218 and transfer (e.g., send or upload) the application extensions to the application server 202 using the extensibility console 204. In some implementations, once an extension is generated or otherwise completed, it can be stored in the application server 202 in association with the application 206 for which it is developed. For example, the application server 202 can store a table or list that associates developed application extensions with the application 206. In this way, a developer and/or user interacting with the graphical user interface pages of the extensibility console 204 can view and manage (e.g., rename, delete, edit, update, etc.) application extensions for the application 206.

Once an application extension has been generated, developed, and/or otherwise completed, the application server 202 can validate the application extension. In some implementations, validating the application extension includes verifying whether the application extension complies with one or more standards set by a developer, user, client, customer, the application server 202, the application store 224, a combination thereof, and the like. In other implementations, validating the application extensions includes verifying whether the applications extensions are complete and do not contain any errors which would cause the application server 202, the application store 224, the application 206, the client device 222, and/or the smart device 226 to malfunction and/or fail to operate normally. Additionally, validating the application extension includes verifying whether the application extensions do not include any malicious components (e.g., viruses, malware, spyware, and the like) and/or other content that would inhibit functionality of the application server 202, the application store 224, the application 206, the client device 222, the smart device 226, the network 220, a combination thereof, and the like. In some implementations, validating the application extension includes verifying whether the application extension comply with policies and/or standards of the application store 224, privacy laws, those set by the manufacturers/providers of the smart device 226, a combination thereof, and the like.

In some implementations, the application server 202 can be configured to receive one or more requests for an application extension for the application 206. In some implementations, a request for an application extension can be received from the client device 222 and/or application 206 executing on the client device 222. In some implementations, the application 206 can generate the request and provide the request, through the network 220, to the application server 202 in response to the client device 222 and/or the application 206 detecting that the smart device 226 is in communication with the client device 222 and/or the application 206 and/or that a new functionality and/or characteristic has been added to the smart device 226.

Figure 4:
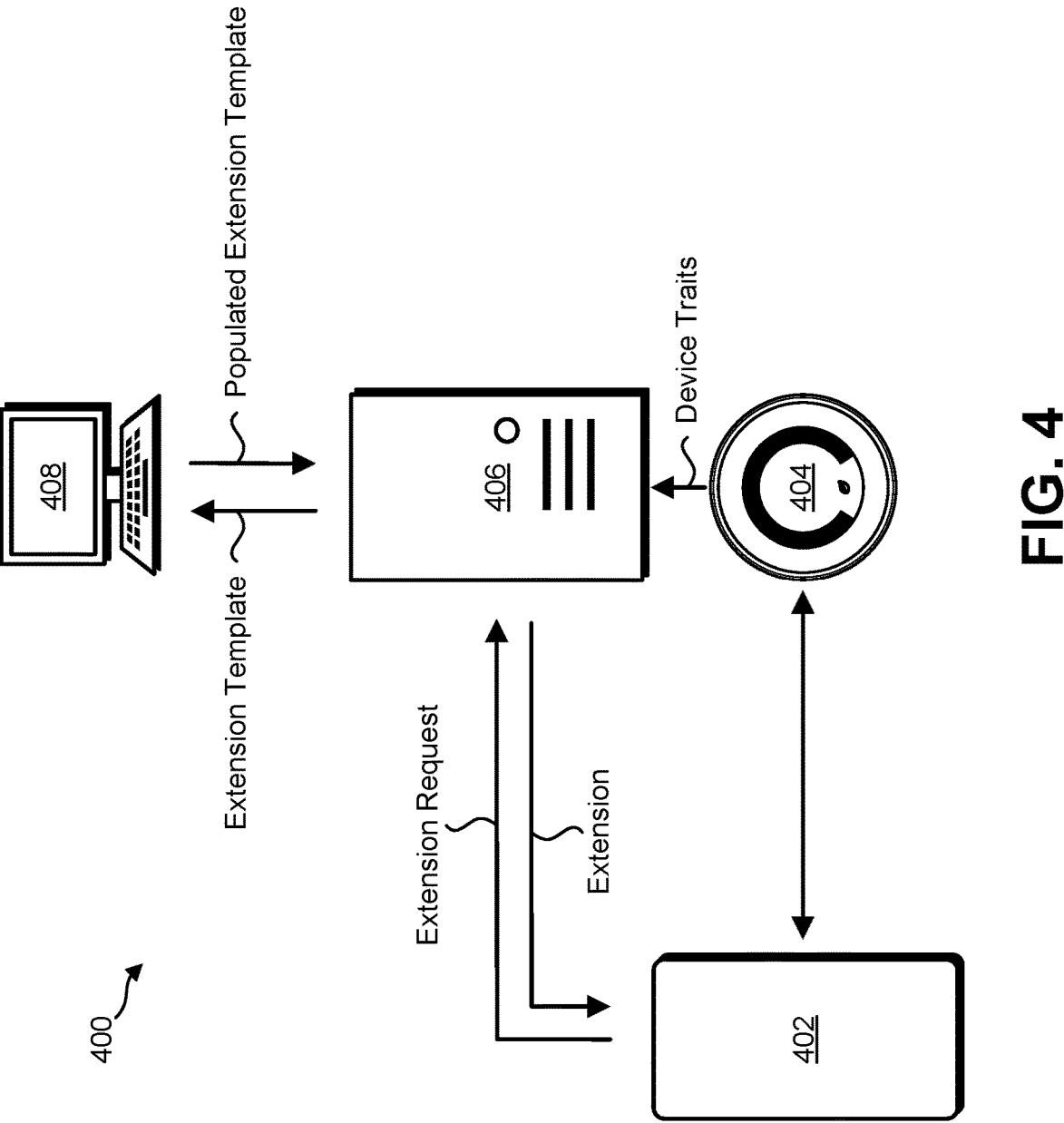
FIG. 4 illustrates an example of a flow for extending functionality of an application according to some implementations of the present disclosure.

For example, as shown in FIG. 4, which illustrates an example of a flow 400 for extending the functionality of an application, a client device 402 executing the application may connect to a smart device 404 and, in response, request an application extension for the application from a server 406. The application extension can be a JavaScript-based extension for dynamically extending the functionality of the application. The extended functionality can enable the application to facilitate setup, control, and management of the smart device 404. The extension can be generated by the server 406, which can receive device traits from the smart device 404, generate an application extension template based on the device traits, send the application extension template to a developer device 408. In response, the developer device 408 can populate the extension template and send to the server 406 where it can be used to generate the extension. Once the extension container of the application extension is received by the application of the client device 402, the dynamic layout engine of the application, as described above, can generate the graphical user interface pages based on the extension container. For example, as described above, the dynamic layout engine can decode and implement the instructions included in the extension container and arrange the selected user interface elements from the user interface library of the applications in graphical user interface pages according to the instructions.

In this way, smart devices can be integrated into applications by extending the functionalities of the applications with minimal software/hardware development effort by the device manufacturers/brands and without modifying the native experiences (e.g., look, feel, and operation) of the applications. Additionally, the features and techniques described herein are cross-platform and can the extend the functionality of any application executing on any operating system and on any device. With the techniques disclosed herein, technical and non-technical users can setup, control, and manage their smart devices, even if manufactured/offered by different manufacturers/brands, in an intuitive way and in a way that does violate any application store policies that may exist, privacy laws, and others. Additionally, the features and techniques described herein enable smart device setup, control, and management without manufacturers/brands develop/providing specialized applications for setup, control, and management of their smart devices.

The foregoing features have been described in relation to a smart home application and controlling a smart thermostat; however, this is not intended to be limiting and the techniques described throughout can be applied to other applications and other smart devices. In some implementations, the techniques throughout can be applied to an operating system of an electronic device and components of the electronic device. Examples of smart devices include, but are not limited to, assistant devices (e.g., Google® Nest® Hub; Google® Nest® Hub Max); home automation controllers (e.g., controller for an alarm system, thermostat, lighting system, door lock, motorized doors, etc.); home appliance devices (e.g., smart speaker, smart television, streaming stick such as a Google® Chromecast®), home theater system, smart refrigerator, smart dishwasher, smart washer, smart dryer, smart air purifier, smart vacuum, smart light, etc.). The foregoing implementations are not intended to be limiting and the smart device can be implemented as any kind of device that can be configured to be controlled by another device using a part of or all of the methods disclosed herein.

Figure 5A:
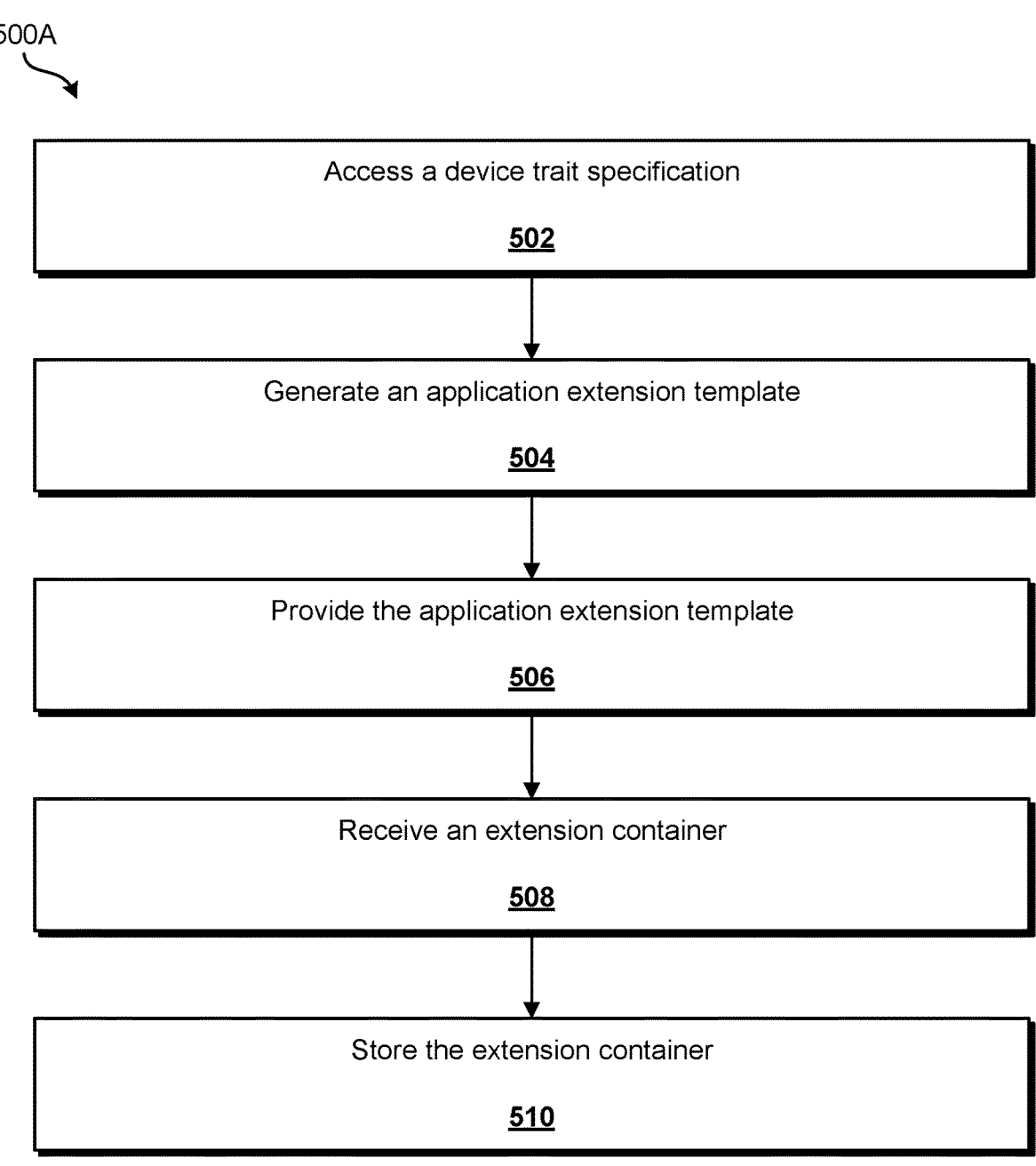
FIG. 5A illustrates an example of a process for extending functionality of an application according to some implementations of the present disclosure.

FIG. 5A illustrates an example process 500A for extending functionality of an application. The process 500A can be implemented by a server such as the application server 202 shown in FIG. 2 and/or an electronic device such as the electronic device 702 shown in FIG. 7. Additionally, the process 500A can be implemented in software or hardware or any combination thereof.

At block 502, a device trait specification is accessed. In some implementations, the device trait specification is associated with a smart device that is in wireless communication with an electronic device. In some implementations, the device trait specification includes a set of device traits, where each device trait of the set of device traits corresponding to a characteristic and/or function of the smart device. In some implementations, the device trait specification is received from the smart device by a server such as the application server 202 and/or stored on the server, where it can be accessed. In some implementations, the device trait specification is received from a developer device by the application server 202 and/or stored on the server, where it can be accessed.

At block 504, an application extension template is generated. In some implementations, the application extension template is generated based on the device trait specification. For example, a stored device trait specification can be accessed and used to generate the application extension template. In some implementations, the application extension template includes a layout defining section for defining a layout of a graphical user interface page of the application and a binding section for binding at least one device trait of the set of device traits to the application. In some implementations, the application extension template is populated with the layout defining values and the binding values based on input received by a user interface of a developer device. In some implementations, the application extension template is generated in a programming language such as JavaScript.

At block 506, the application extension template is provided to an electronic device such as a developer device.

At block 508, an extension container is received. In some implementations, the extension container is received from the developer device. In some implementations, the extension container includes the application extension template populated with layout defining values and binding values. The layout defining values can be configured to define a layout of the graphical user interface page and the binding values can be configured to link a subset of device traits of the set of device traits to the graphical user interface page. In some implementations, the binding values are configured to link the subset of device traits to a plurality of graphical user interface elements, where each element of the plurality of graphical user interface elements is configured to cause a function of the smart device to be controlled based on a device trait included in the subset of device traits. In some implementations, the extension container is generated in and/or based on a programming language such as JavaScript.

At block 510, the extension container is stored. In some implementations, the extension container is stored upon receipt. In some implementations, the stored extension container is accessed.

Figure 5B:
FIG. 5B illustrates another example of a process for extending functionality of an application according to some implementations of the present disclosure.
Figure 5B:
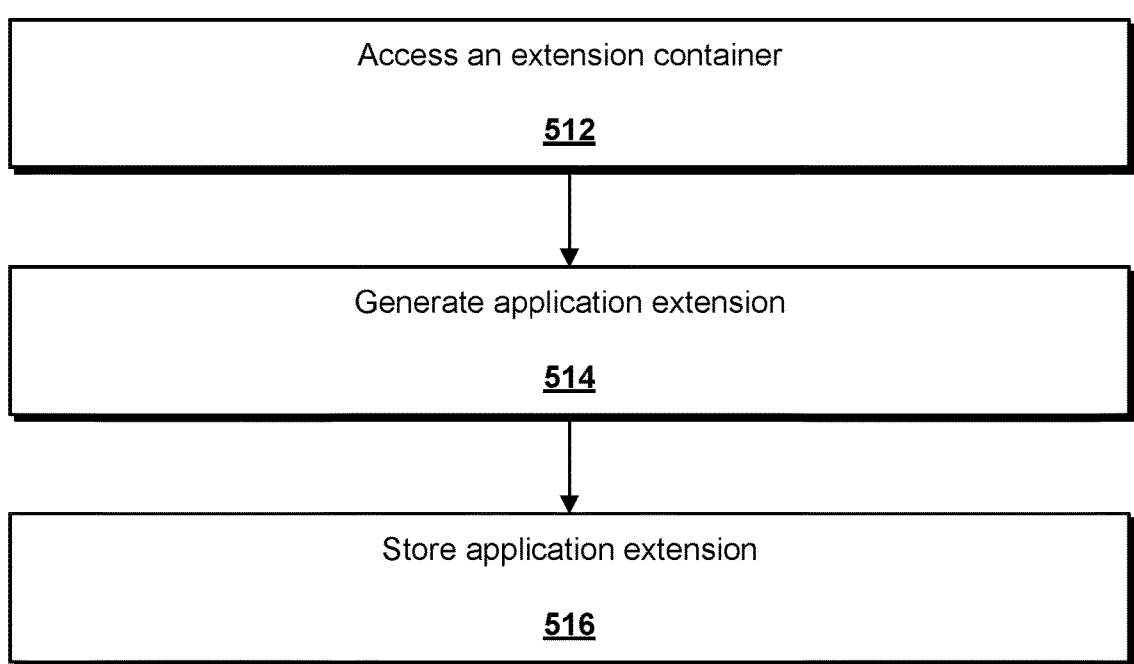

FIG. 5B illustrates another example process 500B for extending functionality of an application. The process 500B can be implemented by a server such as the application server 202 shown in FIG. 2 and/or an electronic device such as the electronic device 702 shown in FIG. 7. Additionally, the process 500B can be implemented in software or hardware or any combination thereof.

At block 512, an extension container is accessed. In some implementations, the extension container is accessed from a storage device of a server such as a cloud-based server and/or an application server. In some implementations, the extension container is accessed from an electronic device such as a developer device. In some implementations, the extension container is accessed in response to receiving a request for an application extension. In some implementations, the extension container is accessed upon the extension container being received from an electronic device such as the developer device.

At block 514, the application extension is generated. In some implementations, the application extension is generated in response to the receiving the request for the application extension. In some implementations, the application extension is generated upon accessing an extension container. In some implementations, an application extension is generated by selecting an extension container, accessing the selected extension container, and forming an application extension with the accessed extension container. In some implementations, the application extension can be based on a programming language such as JavaScript.

At block 516, the application extension is stored. In some implementations, the application extension container is stored upon generation. In some implementations, the stored application extension can be accessed and provided to an electronic device such as a client device.

Figure 5C:
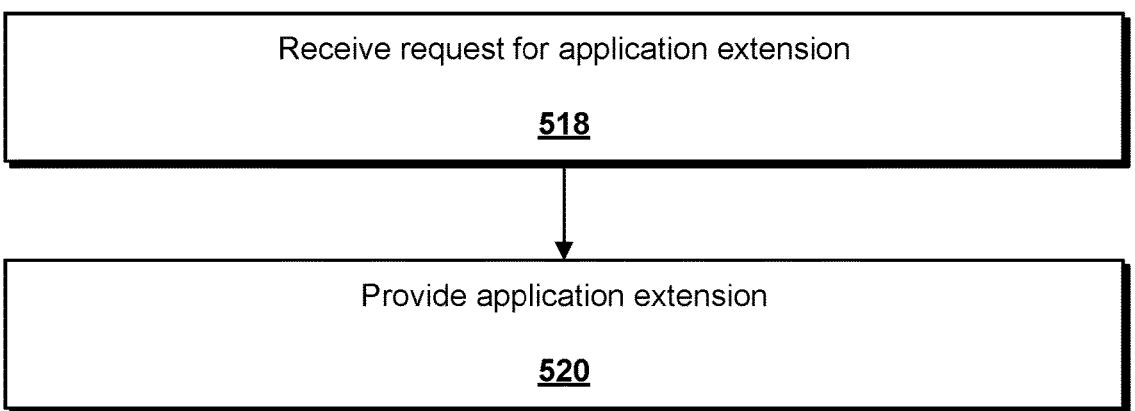
FIG. 5C illustrates another example of a process for extending functionality of an application according to some implementations of the present disclosure.

FIG. 5C illustrates another example process 500C for extending functionality of an application. The process 500C can be implemented by a server such as the application server 202 shown in FIG. 2 and/or an electronic device such as the electronic device 702 shown in FIG. 7. Additionally, the process 500C can be implemented in software or hardware or any combination thereof.

At block 518, a request for an application extension is received. In some implementations, the request for the application extension is received from an electronic device such as a client device. In some implementations, the request for the application extension is received from the application executing on the electronic device. In some implementations, the application generates the request and provides the request to the application server in response to the electronic device and/or the application detecting that the smart device is in communication with the electronic device and/or the application and/or that a new functionality and/or characteristic has been added to the smart device.

At block 512, the application extension is provided. In some implementations, the application extension is provided in response to the receiving the request for the application extension. In some implementations, the application extension is provided to the electronic device. In some implementations, the application extension and/or extension container is configured, when implemented, to cause the graphical user interface page of the application to be displayed on a display of the electronic device with the layout. In some implementations, the layout includes the plurality of graphical user interface elements which can be configured to cause the smart device to be controlled based on the device traits in the subset of device traits.

Figure 6:
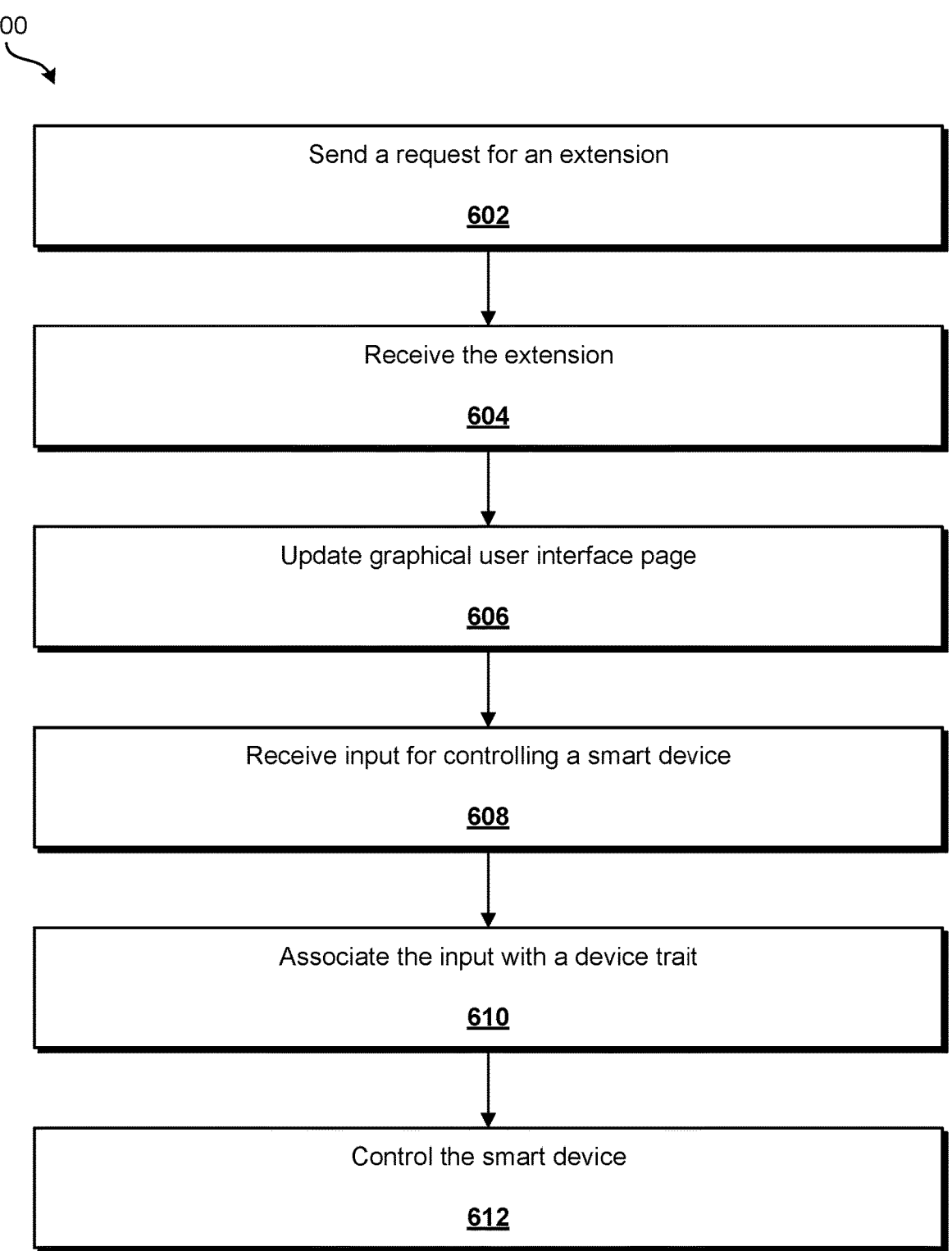
FIG. 6 illustrates an example of a process for controlling a device using an application with extended functionality according to some implementations of the present disclosure.

FIG. 6 illustrates an example process 600 for controlling a device using an application with extended functionality according to some implementations of the present disclosure. The process 600 can be implemented by a client device such as the client device 222 and/or an electronic device such as the electronic device 702 shown in FIG. 7. Additionally, the process 600 can be implemented in software or hardware or any combination thereof.

At block 602, a request for an extension is sent. In some implementations, the request for an extension is sent in response to a request to facilitate an out of the box experience, control and/or operate, and change the settings or the preferences of a smart device being received. In some implementations, the request is generated by the smart device and/or a user of the smart device.

At block 604, an extension is received. In some implementations, the extension is received in response to request for the extension. The extension can be received from a server. The extension can include an application extension template populated with at least one value in a layout defining section of the application extension template and at least one value in a binding section of the application extension template. The application extension template can be generated by the server based on a device trait specification. A layout of a graphical user interface page can be defined by the layout defining section and at least one trait of the device trait specification can be bound by the binding section. The device trait specification can be associated with a smart device and be received by the server from a smart device. The device trait specification can include device traits with each device trait corresponding to and/or characterizing one or more functions of the smart device. The extension container can be populated with the at least one value in the layout defining section and the at least one value in the binding section based on input received at the server by a developer device from an extension developer. The extension container can be based on JavaScript.

At block 606, the graphical user interface page is updated. The graphical user interface page can be updated based on the at least one value in the layout defining section. The at least one value in the binding section can enable control of the smart device.

At block 608, an input for controlling a smart device is received. The input can be received from the smart device and/or a user interacting with the graphical user interface page. The input can control the smart device based on the one or more functions of the smart device characterized by the device trait specification.

At block 610, the input is associated with at least one device trait of the device trait specification. The input can be associated with the at least one device trait based on the at least one device being bound by the binding section.

At block 612, the smart device is controlled. The smart device can be controlled based on the at least one device trait.

Figure 7:
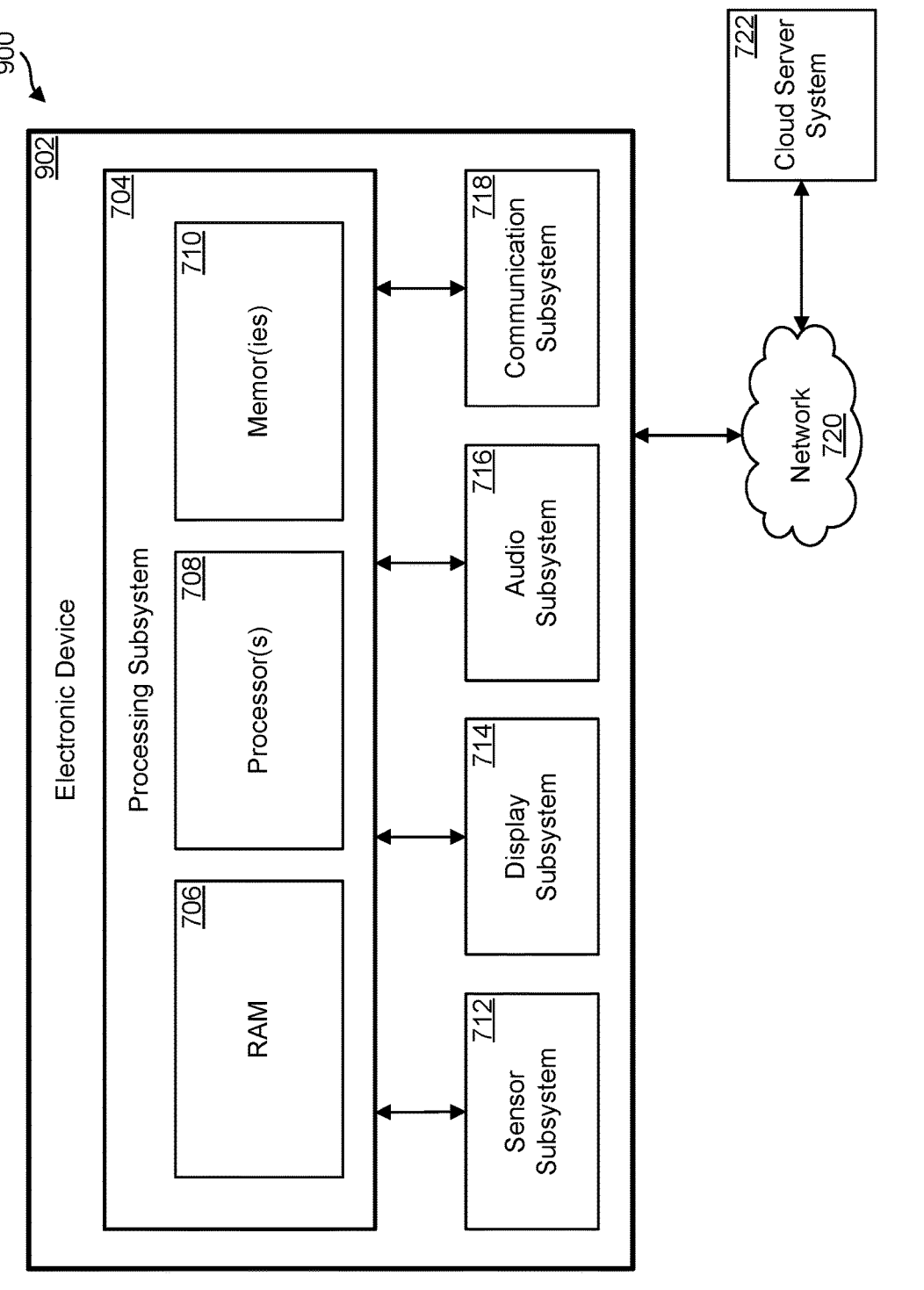
FIG. 7 illustrates an example system incorporating an electronic device according to some implementations of the present disclosure.

FIG. 7 illustrates an example system 700 incorporating an electronic device 702 according to some aspects of the present disclosure. The system 700 can include electronic device 702, network 720, and cloud server system 722. The electronic device 702 can include a processing subsystem 704, a sensor subsystem 712, a display subsystem 714, an audio subsystem 716, and a communication subsystem 718. In some implementations, the electronic device 702 can be a portable computing device and/or mobile phone such as a Google® Pixel® Tablet and Google® Pixel® Phone and/or an assistant device such as a Google® Nest® Hub and Google® Nest® Hub Max.

The processing subsystem 704 includes RAM 706, one or more processors 708, and one or more memories 710. The one or more processors 708 can read one or more programs from the one or more memories 710 and execute them using RAM 706. Each of the one or more processors 708 can be of any type including but not limited to a microprocessor, a microcontroller, a graphical processing unit, a digital signal processor, an application-specific integrated circuit (ASIC), a field programmable gate array (FPGA), or any combination thereof. In some implementations, the one or more processors 708 can include a plurality of cores, a plurality of arrays, one or more coprocessors, and/or one or more layers of local cache memory. The one or more processors 708 can execute one or more programs stored in the one or more memories 710 to perform the operations and/or methods, including parts thereof, described herein.

Each of the one or more memories 710 can be non-volatile and can include any type of memory device that retains stored information when powered off. Non-limiting examples of memory include electrically erasable and programmable read-only memory (EEPROM), flash memory, or any other type of non-volatile memory. At least one memory of the one or more memories 710 can include a non-transitory computer-readable storage medium from which the one or more processors 708 can read instructions. A computer-readable storage medium can include electronic, optical, magnetic, or other storage devices capable of providing the one or more processors 708 with computer-readable instructions or other program code. Non-limiting examples of a computer-readable storage medium include magnetic disks, memory chips, read-only memory (ROM), RAM, an ASIC, a configured processor, optical storage, or any other medium from which a computer processor can read the instructions.

The sensor subsystem 712 can be configured to sense information about an environment in which the electronic device 702 is located. Examples of sensors included in the sensor subsystem 712 include image sensors, ultrasonic sensors, radar sensors, range sensors, LiDAR sensors, and the like.

The display subsystem 714 can be configured to display color images, grayscale images, video frames, depth images, three-dimensional (3D) images, and other content on a display screen of the electronic device 702 and receive input from a user of the electronic device 702. Examples of the display screen included in the display subsystem 714 include a liquid crystal display, a light emitting diode display, an organic light emitting diode display, a projector display, a touchscreen display, and the like.

The audio subsystem 716 can be configured to record sounds from the environment surrounding the electronic device 702 and output sounds to the environment surrounding the electronic device 702. Examples of audio devices included in audio subsystem 716 include microphones, speakers, and other audio/sound transducers for receiving and outputting audio signals and other sounds.

The communications subsystem 718 can be configured to enable the electronic device 702 to communicate with various wired or wireless networks and other systems and devices. For example, communications subsystem 718 can enable the electronic device 702 to communicate with network 720. Network 720 can include one or more private and/or public networks, such as the Internet. Network 720 can be used such that electronic device 702 can communicate with the cloud server system 722. Cloud server system 722 can, in some implementations, perform some of the processing functions performed by processing subsystem 704. Additionally, or alternatively, cloud server system 722 can be used to relay notifications and/or store data generated by the electronic device 702. For instance, in association with the user account, alerts and/or notifications generated by electronic device 702 can be logged by cloud server system 722. Examples of communications devices included in communications subsystem 718 include wireless communication modules and chips, wired communication modules and chips, chips for communicating over local area networks, wide area networks, cellular networks, satellite networks, fiber optic networks, and the like, systems on chips, and other circuitry that enables the electronic device 702 to send and receive data.

Although not shown, the electronic device 702 can also include other components that provide the electronic device 702 with various functionality. Other components can include storage devices, power generating/storing devices, input/output (I/O) components, and the like. The foregoing configurations of the electronic device 702 are not intended to be limiting and the electronic device 702 can include other subsystems, devices, and components.

Figure 8:
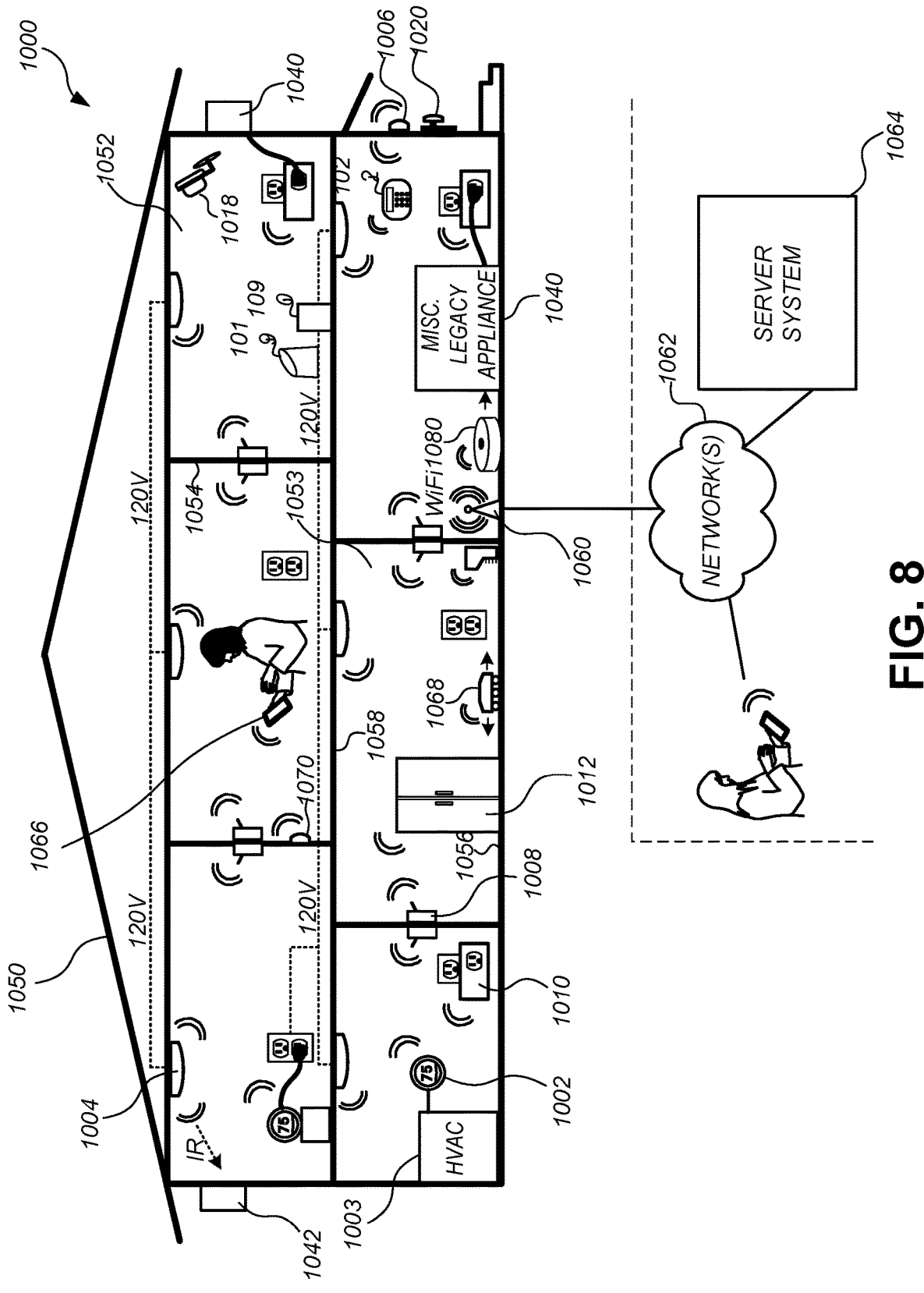
FIG. 8 illustrates an exemplary embodiment of a smart home environment that includes various smart home devices according to some implementations of the present disclosure.

FIG. 8 illustrates an embodiment of a smart home environment 800 that includes various smart home devices that can be set up, controlled, and managed with an application that has been extended according to the techniques described herein. The smart home environment 800 includes a structure 850 (e.g., a house, daycare, office building, apartment, condominium, garage, or mobile home) with various integrated devices. It will be appreciated that devices may also be integrated into a smart home environment 800 that does not include an entire structure 850, such as an apartment or condominium. Further, the smart home environment 800 may control and/or be coupled to devices outside of the actual structure 850. Indeed, several devices in the smart home environment 800 need not be physically within the structure 850.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or workspace.

It is also to be appreciated that while the terms user, customer, installer, homeowner, occupant, guest, tenant, landlord, repair person, and the like may be used to refer to the person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 850 includes a plurality of rooms 852, separated at least partly from each other via walls 854. The walls 854 may include interior walls or exterior walls. Each room may further include a floor 856 and a ceiling 858. Devices may be mounted on, integrated with and/or supported by a wall 854, floor 856, or ceiling 858.

In some implementations, the integrated devices of the smart home environment 800 include intelligent, multi-sensing, network-connected devices that integrate seamlessly with each other in a smart home network and/or with a central server or a cloud-computing system to provide a variety of useful smart home functions. The smart home environment 800 may include one or more intelligent, multi-sensing, network-connected thermostats 802 (hereinafter referred to as "smart thermostats 802"), one or more intelligent, network-connected, multi-sensing hazard detection units 804 (hereinafter referred to as "smart hazard detectors 804"), one or more intelligent, multi-sensing, network-connected entryway interface devices 806 and 820 and one or more intelligent, multi-sensing, network-connected alarm systems 822 (hereinafter referred to as "smart alarm systems 822"). Each of these devices may have the functionality of electronic device 110/202 incorporated.

In some implementations, the one or more smart thermostats 802 detect ambient climate characteristics (e.g., temperature and/or humidity) and control an HVAC system 803 accordingly. For example, a respective smart thermostat 802 includes an ambient temperature sensor.

A smart hazard detector may detect smoke, carbon monoxide, and/or some other hazard present in the environment. The one or more smart hazard detectors 804 may include thermal radiation sensors directed at respective heat sources (e.g., a stove, oven, other appliances, a fireplace, etc.). For example, a smart hazard detector 804 in a kitchen 853 includes a thermal radiation sensor directed at a network-connected appliance 812. A thermal radiation sensor may determine the temperature of the respective heat source (or a portion thereof) at which it is directed and may provide corresponding black-body radiation data as output.

The smart doorbell 806 and/or the smart door lock 820 may detect a person's approach to or departure from a location (e.g., an outer door), control doorbell/door locking functionality (e.g., receive user inputs from a portable electronic device 866 to actuate the bolt of the smart door lock 820), announce a person's approach or departure via audio or visual means, and/or control settings on a security system (e.g., to activate or deactivate the security system when occupants go and come). In some implementations, the smart doorbell 806 includes a camera, and, therefore, is also called "doorbell camera 806" in this document.

The smart alarm system 822 may detect the presence of an individual within close proximity (e.g., using built-in IR sensors), sound an alarm (e.g., through a built-in speaker, or by sending commands to one or more external speakers), and send notifications to entities or users within/outside of the smart home environment 800. In some implementations, the smart alarm system 822 also includes one or more input devices or sensors (e.g., keypad, biometric scanner, NFC transceiver, microphone) for verifying the identity of a user, and one or more output devices (e.g., display, speaker). In some implementations, the smart alarm system 822 may also be set to an armed mode, such that detection of a trigger condition or event causes the alarm to be sounded unless a disarming action is performed. Each of these devices may have the functionality of electronic device 110/202 incorporated.

In some implementations, the smart home environment 800 includes one or more intelligent, multi-sensing, network-connected wall switches 808 (hereinafter referred to as "smart wall switches 808"), along with one or more intelligent, multi-sensing, network-connected wall plug interfaces 810 (hereinafter referred to as "smart wall plugs 810"). The smart wall switches 808 may detect ambient lighting conditions, detect room-occupancy states, and control a power and/or dim state of one or more lights. In some instances, smart wall switches 808 may also control a power state or speed of a fan, such as a ceiling fan. The smart wall plugs 810 may detect occupancy of a room or enclosure and control the supply of power to one or more wall plugs (e.g., such that power is not supplied to the plug if nobody is at home). Each of these types of devices may have the functionality of electronic device 110/202 incorporated.

In some implementations, the smart home environment 800 of FIG. 8 includes a plurality of intelligent, multi-sensing, network-connected appliances 812 (hereinafter referred to as "smart appliances 812"), such as refrigerators, stoves, ovens, televisions, washers, dryers, lights, stereos, intercom systems, wall clock, garage-door openers, floor fans, ceiling fans, wall air conditioners, pool heaters, irrigation systems, security systems, space heaters, window AC units, motorized duct vents, and so forth. Each of these devices may have the functionality of electronic device 110/202 incorporated. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 840, such as old conventional washer/dryers, refrigerators, and the like, which may be controlled by smart wall plugs 810. The smart home environment 800 may further include a variety of partially communicating legacy appliances 842, such as infrared ("IR") controlled wall air conditioners or other IR-controlled devices, which may be controlled by IR signals provided by the smart hazard detectors 804 or the smart wall switches 808.

In some implementations, the smart home environment 800 includes one or more network-connected cameras 818 that are configured to provide video monitoring and security in the smart home environment 800. Cameras 818 may be mounted in a location, such as indoors and to a wall or can be moveable and placed on a surface. Various embodiments of cameras 818 may be installed indoors or outdoors. Each of these types of devices may have the functionality of electronic device 110/202 incorporated. Cameras 818 may be used to determine occupancy of the structure 850 and/or particular rooms 852 in the structure 850, and thus may act as occupancy sensors. For example, video captured by the cameras 818 may be processed to identify the presence of an occupant in the structure 850 (e.g., in a particular room 852). Specific individuals may be identified based, for example, on their appearance (e.g., height, face) and/or movement (e.g., their walk/gait). Cameras 818 may additionally include one or more sensors (e.g., IR sensors, motion detectors), input devices (e.g., microphone for capturing audio), and output devices (e.g., speaker for outputting audio). In some implementations, the cameras 818 are each configured to operate in a day mode and in a low-light mode (e.g., a night mode). In some implementations, the cameras 818 each include one or more IR illuminators for providing illumination while the camera is operating in the low-light mode. In some implementations, the cameras 818 include one or more outdoor cameras. In some implementations, the outdoor cameras include additional features and/or components such as weatherproofing and/or solar ray compensation.

The smart home environment 800 may additionally or alternatively include one or more other occupancy sensors (e.g., the smart doorbell 806, smart door locks 820, touch screens, IR sensors, microphones, ambient light sensors, motion detectors, smart nightlights 870, etc.). In some implementations, the smart home environment 800 includes radio-frequency identification (RFID) readers (e.g., in each room 852 or a portion thereof) that determine occupancy based on RFID tags located on or embedded in occupants. For example, RFID readers may be integrated into the smart hazard detectors 804.

Smart home assistant 819 may have one or more microphones that continuously listen to an ambient environment. Smart home assistant 819 may be able to respond to verbal queries posed by a user, possibly preceded by a triggering phrase. Smart home assistant 819 may stream audio and, possibly, video if a camera is integrated as part of the device, to a cloud-based server system 864 (which represents an embodiment of cloud server system 722 of FIG. 7). Smart home assistant 819 may be a smart device through which non-auditory discomfort alerts may be output and/or an audio stream from the streaming video camera can be output. As previously noted, smart home assistant 819 may have the functionality of electronic device 110/202 incorporated.

By virtue of network connectivity, one or more of the smart-home devices may further allow a user to interact with the device even if the user is not proximate to the device. For example, a user may communicate with a device using a computer (e.g., a desktop computer, laptop computer, or tablet) or another portable electronic device 866 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 800 using a network-connected computer or portable electronic device 866. In some examples, some or all of the occupants (e.g., individuals who live in the home) may register their portable electronic device 866 with the smart home environment 800. Such registration may be made at a central server to authenticate the occupant and/or the device as being associated with the home and to give permission to the occupant to use the device to control the smart devices in the home. An occupant may use their registered portable electronic device 866 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering portable electronic devices 866, the smart home environment 800 may make inferences about which individuals live in the home and are therefore occupants and which portable electronic devices 866 are associated with those individuals. As such, the smart home environment may "learn" who is an occupant and permit the portable electronic devices 866 associated with those individuals to control the smart devices of the home.

In some implementations, in addition to containing processing and sensing capabilities, smart thermostat 802, smart hazard detector 804, smart doorbell 806, smart wall switch 808, smart wall plug 810, network-connected appliances 812, cameras 818, smart home assistant 819, smart door lock 820, and/or smart alarm system 822 (collectively referred to as "the smart-home devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, Matter, ZigBee, 3LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 860) to a network, such as the Internet. Through the Internet, the smart devices may communicate with a cloud-based server system 864 (also called a cloud-based server system, central server system, and/or a cloud-computing system herein). Cloud-based server system 864 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from cloud-based server system 864 to smart devices (e.g., when available, when purchased, or at routine intervals).

In some implementations, the network interface 860 includes a conventional network device (e.g., a router), and the smart home environment 800 of FIG. 8 includes a hub device 880 that is communicatively coupled to the network (s) 862 directly or via the network interface 860. The hub device 880 is further communicatively coupled to one or more of the above intelligent, multi-sensing, network-connected devices (e.g., smart devices of the smart home environment 800). Each of these smart devices optionally communicates with the hub device 880 using one or more radio communication networks available at least in the smart home environment 800 (e.g., Matter, ZigBee, Z-Wave, Insteon, Bluetooth, Wi-Fi and other radio communication networks). In some implementations, the hub device 880 and devices coupled with/to the hub device can be controlled and/or interacted with via an application running on a smart phone, household controller, laptop, tablet computer, game console or similar electronic device. In some implementations, a user of such a controller application can view the status of the hub device or coupled smart devices, configure the hub device to interoperate with smart devices newly introduced to the home network, commission new smart devices, and adjust or view settings of connected smart devices, etc. In some implementations the hub device extends capabilities of low capability smart devices to match capabilities of the highly capable smart devices of the same type, integrates functionality of multiple different device types—even across different communication protocols—and is configured to streamline adding of new devices and commissioning of the hub device. In some implementations, hub device 880 further includes a local storage device for storing data related to, or output by, smart devices of smart home environment 800. In some implementations, the data includes one or more of: video data output by a camera device, metadata output by a smart device, settings information for a smart device, usage logs for a smart device, and the like.

In some implementations, smart home environment 800 includes a local storage device 890 for storing data related to, or output by, smart devices of smart home environment 800. In some implementations, the data includes one or more of: video data output by a camera device (e.g., cameras 818 or smart doorbell 806), metadata output by a smart device, settings information for a smart device, usage logs for a smart device, and the like. In some implementations, local storage device 890 is communicatively coupled to one or more smart devices via a smart home network. In some implementations, local storage device 890 is selectively coupled to one or more smart devices via a wired and/or wireless communication network. In some implementations, local storage device 890 is used to store video data when external network conditions are poor. For example, local storage device 890 is used when an encoding bitrate of cameras 818 exceeds the available bandwidth of the external network (e.g., network(s) 862). In some implementations, local storage device 890 temporarily stores video data from one or more cameras (e.g., cameras 818) prior to transferring the video data to a server system (e.g., cloud-based server system 864).

Further included and illustrated in the exemplary smart home environment 800 of FIG. 8 are service robots 868, each configured to carry out, in an autonomous manner, any of a variety of household tasks. For some embodiments, the service robots 868 can be respectively configured to perform floor sweeping, floor washing, etc.

In some embodiments, a service robot may follow a person from room to room and position itself such that the person can be monitored while in the room. The service robot may stop in a location within the room where it will likely be out of the way, but still has a relatively clear field-of-view of the room. Service robots 868 may have the functionality of electronic device 110/202 incorporated therein. Such an arrangement may have the advantage of allowing one service robot with the functionality of electronic device 110/202 incorporated to detect and track a person throughout multiple rooms or in a large space.

The systems and methods of the present disclosure may be implemented using hardware, software, firmware, or a combination thereof and may be implemented in one or more computer systems or other processing systems. Some embodiments of the present disclosure include a system including a processing system that includes one or more processors. In some embodiments, the system includes a non-transitory computer readable storage medium containing instructions which, when executed on the one or more processors, cause the system and/or the one or more processors to perform part or all of one or more methods and/or part or all of one or more processes disclosed herein. Some embodiments of the present disclosure include a computer-program product tangibly embodied in a non-transitory machine-readable storage medium, including instructions configured to cause the system and/or the one or more processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifi- cally disclosed by embodiments and optional features, modi- fication, and variation of the concepts herein disclosed may be resorted to by those skilled in the art, and that such modifications and variations are considered to be within the scope of this invention as defined by the appended claims.

Specific details are given in the following description to provide a thorough understanding of the embodiments. However, it will be understood that the embodiments may be practiced without these specific details. For example, cir- cuits, systems, networks, processes, and other components may be shown as components in block diagram form in order not to obscure the embodiments in unnecessary detail. In other instances, well-known circuits, processes, algo- rithms, structures, and techniques may be shown without unnecessary detail in order to avoid obscuring the embodi- ments.

The above description of certain examples, including illustrated examples, has been presented only for the pur- pose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

What is claimed is:

1. A method for extending functionality of an application executing on an electronic device, the method comprising:
   accessing an extension container of the application, the extension container comprising a set of instructions including layout defining values configured to define a layout of a graphical user interface of the application and binding values configured to link device traits to the graphical user interface, wherein each device trait of the device traits corresponds to a function of a smart device that is in wireless communication with the electronic device, wherein the layout comprises a plu- rality of user interface elements corresponding to one or more of the device traits;
   dynamically generating, via a dynamic layout engine of the application, the graphical user interface by arrang- ing the plurality of user interface elements based on the set of instructions; and
   causing the graphical user interface of the application to be displayed on a display of the electronic device with the layout.

2. The method of claim 1, wherein the plurality of user interface elements that are configured to cause the smart device to be controlled based on the corresponding device traits.

3. The method of claim 2, wherein the binding values are configured to link the device traits to the plurality of user interface elements.

4. The method of claim 1, wherein prior to displaying the graphical user interface to the electronic device, the method further comprises:
   receiving a request for an application extension from the electronic device.

5. The method of claim 1, wherein the set of instructions is populated with the layout defining values and the binding values based on input received by a user.

6. The method of claim 1, wherein the device traits are included in a device trait specification that is associated with the smart device, wherein the device traits correspond to at least one of: thermostat traits, presence detecting traits, security traits, and lighting traits.

7. The method of claim 1, wherein the extension container comprises instructions formatted in a programming lan- guage.

8. The method of claim 1, wherein the plurality of user interface elements is stored in a library of user interface elements in the application, wherein the dynamic layout engine executes the set of instructions to select the user interface elements from the library.

9. The method of claim 8, wherein the dynamic layout engine is configured to decode and interpret the set of instructions in the extension container to select the user interface elements from the library.

10. A system comprising:
    a processing system; and
    at least one computer-readable medium storing instruc- tions which, when executed by the processing system, cause the system to perform operations comprising:
       accessing an extension container of the application, the extension container comprising with a set of instruc- tions including layout defining values configured to define a layout of a graphical user interface of an application executing on an electronic device and binding values configured to link device traits to the graphical user interface, wherein each device trait of the device traits corresponds to a function of a smart device that is in wireless communication with the electronic device, wherein the layout comprises a plurality of user interface elements corresponding to one or more of the device traits;
       dynamically generating, via a dynamic layout engine of the application, the graphical user interface by arranging the plurality of user interface elements based on the set of instructions; and
       causing the graphical user interface of the application to be displayed on a display of the electronic device with the layout.

11. The system of claim 10, wherein the layout comprises a plurality of user interface elements are configured to cause the smart device to be controlled based on the corresponding device traits.

12. The system of claim 11, wherein the binding values are configured to link the device traits to the plurality of user interface elements.

13. The system of claim 10, wherein prior to providing the graphical user interface to the electronic device, the opera- tions further comprising:
    receiving a request for an application extension from the electronic device.

14. The system of claim 10, wherein the set of instructions is populated with the layout defining values and the binding values based on input received by a user.

15. The system of claim 10, wherein the device traits are included in a device trait specification that is associated with the smart device, wherein the device traits correspond to at least one of: thermostat traits, presence detecting traits, security traits, and lighting traits.

16. The system of claim 10, wherein the extension con- tainer comprises instructions formatted in a programming language.

17. One or more non-transitory computer-readable media storing instructions which, when executed by at least one processing system, cause a system to perform operations comprising:

accessing an extension container, the extension container comprising with a set of instructions including layout defining values configured to define a layout of a graphical user interface of an application executing on an electronic device and binding values configured to link device traits to the graphical user interface, wherein each device trait of the device traits corresponds to a function of a smart device that is in wireless communication with the electronic device, wherein the layout comprises a plurality of user interface elements corresponding to one or more of the device traits;

dynamically generating, via a dynamic layout engine of the application, the graphical user interface by arranging the plurality of user interface elements based on the set of instructions; and causing the graphical user interface of the application to be displayed on a display of the electronic device with the layout.

18. The one or more non-transitory computer-readable media of claim 17, wherein the plurality of user interface elements are configured to cause the smart device to be controlled based on the corresponding device traits.

19. The one or more non-transitory computer-readable media of claim 18, wherein the binding values are configured to link the device traits to the plurality of user interface elements.

20. The one or more non-transitory computer-readable media of claim 17, wherein prior to providing the graphical user interface to the electronic device, the operations further comprising:

receiving a request for an application extension from the electronic device.

\* \* \* \* \*